United States Patent

[11] 3,596,468

[72] Inventor Herbert K. Fairbanks
 SR 35, Box 195, St. George, Maine 04857
[21] Appl. No. 836,685
[22] Filed June 2, 1969
[45] Patented Aug. 3, 1971

[54] FISH LADDERS
 5 Claims, 7 Drawing Figs.
[52] U.S. Cl. ............................................... 61/21
[51] Int. Cl. ............................................... E02b 8/08
[50] Field of Search .................................... 61/21

[56] References Cited
UNITED STATES PATENTS
2,910,833 11/1959 Pancheri ..................... 61/21
3,293,862 12/1966 Harding ....................... 61/21

Primary Examiner—Jacob Shapiro
Attorney—Eugene G. Horsky

ABSTRACT: A fish ladder having located within one body of water a chamber which is selectively opened and closed to isolate fish therein, and passage means for delivering into the chamber from a second body of water at a higher elevation a predetermined minimum flow of water when the chamber is opened to thereby attract fish therein, and a predetermined maximum flow of water when the chamber is closed whereby fish isolated within the chamber are subjected to increased pressure and instinctively swim through passage means and into the second body of water.

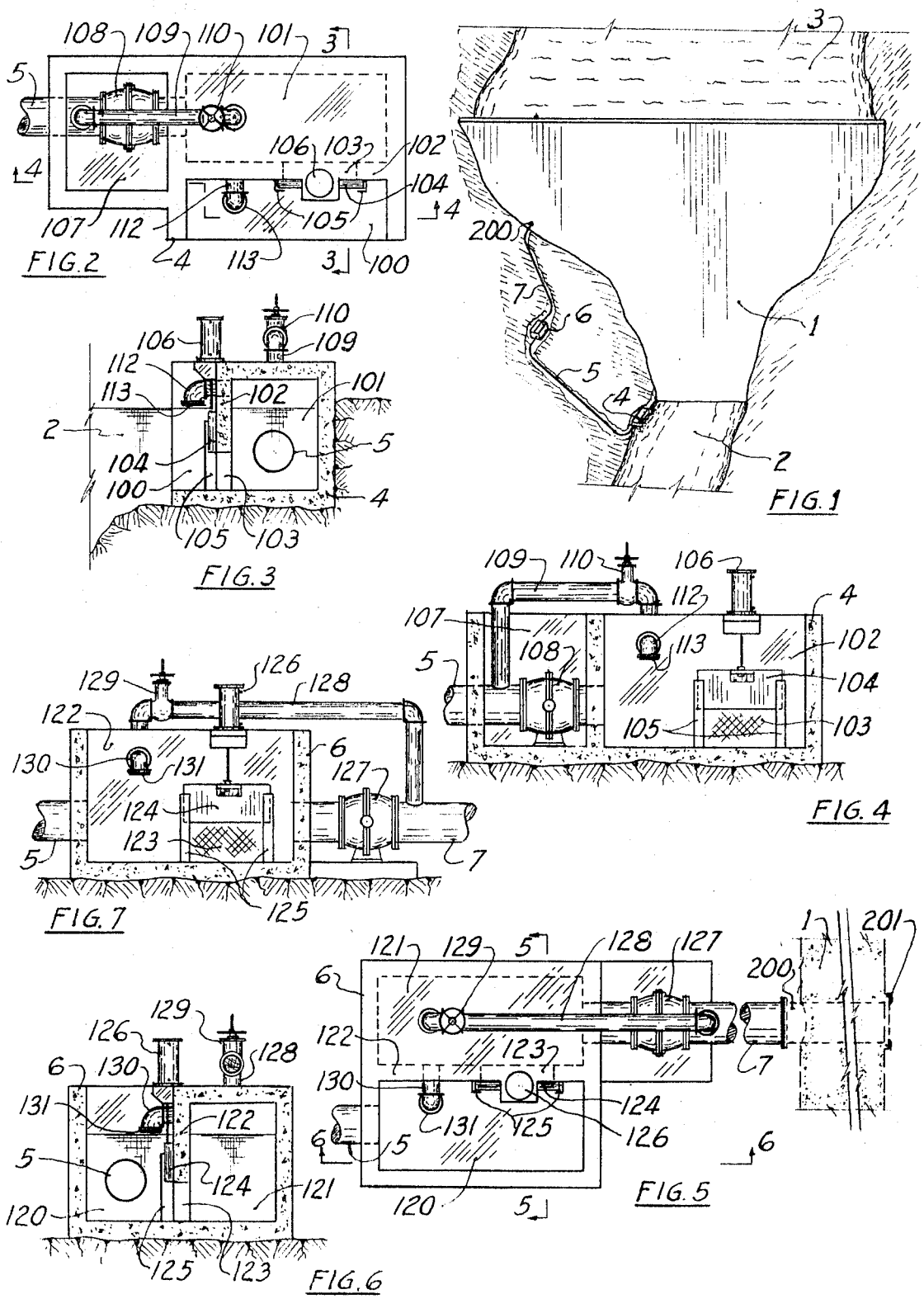

FISH LADDERS

This invention relates to the design and operation of fish ladders to enable fish of the anadromous species to pass dams which prevent their passage upstream to spawning areas. The design and operation of this fish ladder provides a continuous passageway through the dam from the river below to the reservoir above and enable the fish to pass the dam at all times regardless of the level of the water in the reservoir, or of flow conditions in the river.

The type of fish ladder now most commonly used consists of a series of shallow pools, arranged in steps and formed by low weirs set between parallel sidewalls. This type of ladder must be built on a low gradient since the height of weirs is limited by the ability of the fish to leap over. Furthermore, this type fish ladder must be carried to the full height of the dams to enter the reservoir at the level of the water surface therein. For dams of only moderate height this type ladder is long, very expensive to construct, and its passage by fish is exhausting and requires considerable time. Other methods have been used to assist fish to pass dams but none had proved entirely effective, or satisfactory.

This invention has for an object to provide a means whereby anadromous species of fish can easily and quickly pass dams, or other obstructions, which prevent their passage upstreams to spawning areas.

A further object is to provide a fish ladder in which the fish pass upward, in steep rising steps, between rest structures through connecting closed conduits in which water flows continuously at a controlled low velocity.

A further object is to provide a fish ladder from which fish can enter a reservoir above a dam at any desired depth below the surface of the water therein.

A further object object is to provide a fish ladder which can be installed on the steep slope of a rocky gorge, or even on the face of a dam.

A further object is to provide a fish ladder which can be installed close to a dam with the intake located in a pool at the base of the dam, in which area of the stream the fish naturally collect.

A further object is to provide a fish ladder in which all operating elements can be controlled from a remote point, or even automated.

A further object is to provide a fish ladder which is economical to construct and economical to operate and maintain.

Other objects of the invention not mentioned in the foregoing will appear hereinafter.

Referring now to the accompanying drawing which forms part of the application,

FIG. 1 is a general view showing a portion of a river valley in which dam 1 has been constructed across river 2 to form reservoir 3 on one hillside below the dam is a fish ladder comprised of intake structure 4 located at riverside and joined by conduit 5 to structure 6 which is located on the hillside above structure 4, a conduit 7 joins structure 6 with opening 200 in dam 1, thereby providing a continuous passage for fish from river 2 below, to reservoir 3 above dam 1.

FIG. 2 is a plan view of structure 4.

FIG. 3 is a sectional view taken on line 3-3 of FIG. 2.

FIG. 4 is a sectional view taken on line 4-4 of FIG. 2.

FIG. 5 is a plan view of structure 6, showing conduit 7 connecting said structure with opening 200 through dam 1.

FIG. 6 is a sectional view taken on line 5-5 of FIG. 5.

FIG. 7 is a sectional view taken on line 6-6 of FIG. 5,

As shown in FIG. 2, FIG. 3, and FIG. 4, intake structure 4 is comprised of forebay 100 opening into river 2, and closed chamber 101 separated from said forebay by wall 102; said wall having disposed therein opening 103 closeable by gate 104 which is operable in guides 105 by lifting device 106 (shown as hydraulic hoist); said wall also having disposed therein pipe 112 to which is attached discharge control device 113 (shown as an orifice plate).

It is seen in FIG. 2 and FIG. 4 that conduit 5 connects with chamber 101; that disposed in said conduit is valve 108 (actuator not shown) set in valve pit 107 (coverplate not shown; and required only at intake structure); that pipe 109 attached to conduit 5 in a manner to bypass said valve and permits continuous flow in conduit 5 when valve 108 is closed; that disposed in pipe 109 is a flow control device, 110 wherewith the flow in conduit 5 can be controlled at any desired low velocity.

It is seen in FIG. 3 and FIG. 4 that discharge from chamber 101 into forebay 100 is thru opening 103 which provides access to chamber 101 for fish when gate 104 is in the raised position. It is seen that in FIG. 3 when gate 104 is in the lowered position and opening 103 is thereby closed, chamber 101 will fill completely under hydrostatic pressure, with discharge from chamber 101 thru overflow pipe 112; that under this condition valve 108 can be opened to allow fish to leave chamber 101 by way of conduit 5, the low velocity of flow in said conduit being maintained unchanged by reason of control device 113, on overflow pipe 112, As shown in FIG. 3, the normal level of the water surface in forebay 100 and chamber 101 is a little below the outlet of pipe 112 and discharge control device 113. This feature is referred to elsewhere herein.

In FIG. 5 it is seen that structure 6 is comprised of open chamber 120 separated by wall 122 from closed chamber 121; that conduit 5 connects with chamber 120; that conduit 7 connects chamber 121 with opening 200 through dam 1. In FIG. 5, FIG. 6, and FIG. 7 it is seen that disposed in wall 122 is opening 123 closeable by gate 124 operable in guides 125 by lifting device 126 that disposed in said wall 122 is overflow pipe 130 to which is attached discharge control device 131. In FIG. 5 and FIG. 7 it is seen that disposed in conduit 7 is valve 127; that pipe 128 attached to conduit 7 in a manner to bypass said valve and permit continuous flow in conduit 7 when valve 127 is closed; that disposed in pipe 128 is flow control device 129 wherewith the flow in conduit 7 can be controlled at any desired low velocity.

As shown in FIG. 6, the normal level of the water surface in chamber 120 and chamber 121 is a little below the outlet of overflow pipe 130 and discharge control device 131. This feature is referred to elsewhere herein.

It is seen in FIG. 1 and FIG. 5 that conduit 7 connects structure 6 with opening 200 in dam 1 and in FIG. 5 it is seen that gate 201 is placed at the entrance to opening 200. It is to be noted that opening 200 and associated gate 201 are prepared by others to receive connection with conduit 7 and are not parts of this invention; they are included in the drawing only to show a complete fish ladder installation.

A comparison of FIG. 5, FIG. 6, and FIG. 7 of structure 6 with corresponding FIG. 2, FIG. 3, and FIG. 4 of structure 4 shows that the features of structure 6 are the same in all essential respects with the corresponding features of structure 4. A description of the function and operation of each feature shown for structure 6 would be a repetition of the description of like features of structure 4. I believe it unnecessary to repeat these descriptions, since those skilled in the art will readily understand.

At completion of construction of the fish ladder gate 201 at the entrance to opening 200 in dam 1 will be closed and all elements of the ladder will be empty of water. The following procedure may be followed to place the fish ladder in operation;

1. At structure 6 close value 127, raise gate 124 and set valve 129 in part open position.

2. Raise gate 201 to allow water from reservoir 3 to fill conduit 7.

3. Adjust valve 129 to establish the desired velocity of flow in conduit 7.

4. Close gate 124 and open valve 127; chamber 121 fills under hydrostatic pressure with discharge from said chamber through overflow pipe 130.

5. Adjust discharge control device 131 to maintain the velocity of flow previously established in conduit 7.

6. Close valve 127 and raise gate 124, leaving the setting of valve 129 unchanged. Water against outflows from chamber 121 through opening 123, and air flows into said chamber through pipe overflow 130 as the water level therein lowers. It is seen that the outlet end of the pipe 130 must be above the water surface in chamber 120.

At this time water discharged from pipe 128 flows from chamber 121 through opening 123 into chamber 120 and thence into conduit 5.

7. At structure 4, where gate 104 should be in the raised position, set valve 110 in partly open position.

8. Close valve 108.

9. Adjust valve 110 to restrict flow in conduit 5 to cause the water in structure 6 to rise to a level about 1 foot below the outlet of pipe 130 as sown in FIG. 6.

10. Readjust valve 110, as necessary, to hold water in structure 6 at the level; the velocity of flow in conduit 5 will then be the same (very nearly) as the velocity of flow in conduit 7.

11. Close gate 104 and open valve 108; chamber 101 fills under hydrostatic pressure with discharge from chamber 101 being through overflow pipe 112.

12. Adjust discharge control device 113 to maintain the velocity of flow previously established in conduit 5.

13. Close valve 108 and open gate 104, leaving the setting of valve 110 unchanged, Water again outflows from chamber 101 through opening 103 and air flows into said chamber through overflow pipe 112. It is seen that the outlet end of pipe 112 must be above the surface of the water in forebay 100.

At this time there is a continuous and steady flow of water from reservoir 3 thru the full length of the fish ladder to river 2 below the dam with the low velocity of flow in all elements of the fish ladder under complete control. The fish ladder is now ready for operation.

At intake structure 4 the water discharge from pipe 109 falls on the structure of the water in chamber 101, as shown in FIG. 3. The flow from said chamber is through opening 103, which provides access to said chamber for fish entering from river 3. Fish are lured by the outward flow of water from chamber 101, and by the sound of water falling inside said chamber, to enter said chamber. When fish have entered said chamber 101 gate 104 is lowered to close opening 103 and valve 108 is opened. Chamber 101 at once fills under hydrostatic pressure, with discharge from said chamber through overflow pipe 112. The open valve 108 provides an exit passageway for fish from chamber 101 into conduit 5 in which the low velocity of flow is maintained by discharge control device 113. The fish are briefly subjected to pressure much greater than normal and instinctively seek to escape therefrom. The instinct to escape pressure, and the lure of the oncoming flow of water, induce the fish to pass quickly into conduit 5 to emerge into chamber 120 of structure 6.

As soon as fish leave chamber 101 of structure 4 valve 108 is closed and gate 104 is opened. Flow from said chamber 101 is again thru opening 103 into forebay 100 and the original conditions are restored.

Upon arrival in structure 6 the fish may rest briefly in chamber 120 but will quickly be lured by the sound of water falling in chamber 121, and by the outward flow of water therefrom, to enter said chamber. When the fish have entered chamber 121 gate 124 is lowered and valve 127 is opened. Chamber 121 at once fills under hydrostatic pressure, with discharge from said chamber thru overflow pipe 130. The open valve 127 provides an exit passageway for fish from chamber 121 into conduit 7 in which the low velocity of flow is maintained by discharge control device 131. The fish are briefly subjected to a pressure much greater than normal and instinctively seek to escape therefrom. The instinct to escape pressure, and the lure of the oncoming flow of water, induce the fish to pass quickly into conduit 7 to emerge into the open water of reservoir 3. As soon as the fish leave structure 6 valve 127 is closed and gate 124 is raised, thereby restoring flow conditions in structure 6 to the normal state.

It is seen from the above description of the operation of this fish ladder that the fish which enter intake structure 4 can pass quickly and easily from river 2, below, to reservoir 3 above the dam. It is further seen that all operable elements of the fish ladder are easily manipulated and adaptable to manual control, control from a distant point, or to automated control.

It should be noted that the structure and the components thereof described herein and shown on the accompanying drawing are intended only to show the unique and essential features of the fish ladder of this invention; the number, sizes, configuration and materials of construction and relative positions of required structures and the sizes, types and disposition of pipes, valves, gates and hoists, and other equipment required in the construction of this fish ladder must be determined for each installation. It is expected that those skilled in the art will develop complete and adequate designs.

It is to be noted that structure 6, shown in FIG. 1, may not be required in a fish ladder installed at a low dam. For such a project the conduit 5 would connect intake structure 4 directly with opening 200 prepared in dam 1 to receive this connection. For high dams it may be necessary, or desirable to use other structures above the structure 6 shown in FIG. 1. All structures which may be used above intake structure 4 in any fish ladder installation will conform in all essential respects to the corresponding features of structure 6 as shown in FIG. 5, FIG. 6, and FIG. 7. The number of structures thus used, and the maximum elevation of any structure above the one next below, may be determined by the maximum hydrostatic pressure which the specie of fish using the ladder can tolerate.

It is to be noted that it may seem desirable to some designers of this fish to provide internal lighting of conduits or chambers, or other appurtenances; however, the use of any such addition would not alter or modify the nature of the invention.

I claim:

1. A fish ladder including an intake structure located within a first body of water and having a forebay and a chamber, an opening between said forebay and chamber, means for selectively covering and uncovering said opening, passage means provided for a flow of water through said chamber and into said forebay from a second body of water having a surface at a higher elevation than such first body thereof, and a value in said passage means operative in alternate relationship with the means for covering and uncovering said opening for permitting maximum flow of water through said passage means and into said chamber only when said opening is covered, said passage means including a pipe for discharging into said forebay an overflow of water from said chamber.

2. A fish ladder as defined in claim 1 wherein said passage means includes means operative independently of said valve for delivering a continuous, controlled and less than maximum flow of water through said passage means and to said chamber.

3. A fish ladder as defined in claim 2 wherein the passage means includes a conduit which opens at one end into said chamber and at its opposite end thereof into the second body of water, said valve being positioned within said chamber for stopping the flow of water into said chamber through said conduit when said opening is uncovered and permitting such maximum flow when said opening is covered and wherein said means for delivering a continuous, controlled flow of water continuously into said chamber includes a pipe extending between said conduit and said chamber and bypassing said valve.

4. A fish ladder as defined in claim 3 further including a valve in said bypass for controlling the velocity of the flow of water therethrough.

5. A fish ladder as defined in claim 4 further including a valve in said overflow pipe for controlling the velocity of the flow of water therethrough.

UNITED STATES PATENT OFFICE
CERTIFICATE OF CORRECTION

Patent No. 3,596,468          Dated June 2, 1969

Inventor(s)   Herbert K. Fairbanks

It is certified that error appears in the above-identified patent and that said Letters Patent are hereby corrected as shown below:

Col. 3, line 2, "against" should read --again--;
           line 35, "discharge" should read --discharged--;
           line 36, "structure" should read --surface--;

Col. 4, line 9, "structure" should read --structures--;
           line 33, --ladder-- should be inserted after "fish".

Claim 1, line 7, "value" should read --valve--.

Claim 3, line 4, "chamber" should read --conduit--.

Signed and sealed this 28th day of March 1972.

(SEAL)
Attest:

EDWARD M. FLETCHER, JR.  
Attesting Officer

ROBERT GOTTSCHALK  
Commissioner of Patents